(12) United States Patent
Yamasaki et al.

(10) Patent No.: US 10,784,536 B2
(45) Date of Patent: Sep. 22, 2020

(54) LITHIUM SECONDARY BATTERY INCLUDING A NONAQUEOUS ELECTROLYTE CONTAINING A COMPOUND REPRESENTED BY LIO₃S—R—SO₃LI AND METHOD OF MANUFACTURING THE SAME

(71) Applicant: TOYOTA JIDOSHA KABUSHIKI KAISHA, Toyota-shi, Aichi-ken (JP)

(72) Inventors: Hiroshi Yamasaki, Nagoya (JP); Tatsuya Hashimoto, Osaka (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 488 days.

(21) Appl. No.: 15/084,882

(22) Filed: Mar. 30, 2016

(65) Prior Publication Data
US 2016/0294011 A1 Oct. 6, 2016

(30) Foreign Application Priority Data
Mar. 31, 2015 (JP) ................................ 2015-073201

(51) Int. Cl.
*H01M 6/04* (2006.01)
*H01M 10/0567* (2010.01)
*H01M 10/052* (2010.01)
*H01M 4/02* (2006.01)

(52) U.S. Cl.
CPC ..... *H01M 10/0567* (2013.01); *H01M 10/052* (2013.01); *H01M 2004/021* (2013.01); *H01M 2004/027* (2013.01); *H01M 2220/20* (2013.01); *Y02E 60/122* (2013.01); *Y02P 70/54* (2015.11)

(58) Field of Classification Search
CPC .......... H01M 10/052; H01M 10/0525; H01M 10/0567; H01M 2004/021; H01M 2004/027; H01M 2220/20; Y02E 60/122; Y02P 70/54
See application file for complete search history.

(56) References Cited

U.S. PATENT DOCUMENTS

| | | | |
|---|---|---|---|
| 2008/0311472 A1 | 12/2008 | Yamaguchi et al. | |
| 2009/0029252 A1 | 1/2009 | Nakai et al. | |
| 2010/0015514 A1* | 1/2010 | Miyagi ................ | H01M 4/131 429/129 |
| 2010/0092872 A1* | 4/2010 | Abe ..................... | C07C 317/08 429/340 |
| 2012/0308881 A1 | 12/2012 | Tokuda et al. | |
| 2013/0280622 A1 | 10/2013 | Tokuda et al. | |
| 2015/0086880 A1 | 3/2015 | Ahn et al. | |
| 2016/0190645 A1 | 6/2016 | Yamasaki et al. | |
| 2016/0293941 A1 | 10/2016 | Yamasaki et al. | |

FOREIGN PATENT DOCUMENTS

| | | | | |
|---|---|---|---|---|
| JP | 2009-026691 A | | 2/2009 | |
| JP | 4281895 | * | 6/2009 | ........... H01M 10/36 |
| JP | 2011-187440 A | | 9/2011 | |
| JP | 2013-152956 A | | 8/2013 | |
| JP | 2016-122579 A | | 7/2016 | |
| KR | 10-2008-0109665 A | | 12/2008 | |

OTHER PUBLICATIONS

Abstract of JP 4281895, published Jun. 17, 2009.*

* cited by examiner

*Primary Examiner* — Raymond Alejandro
(74) *Attorney, Agent, or Firm* — Sughrue Mion, PLLC (57) ABSTRACT

A method including a step of preparing a positive electrode including a positive electrode mixture layer, a negative electrode including a negative electrode mixture layer, and a nonaqueous electrolyte; and a step of accommodating the positive electrode, the negative electrode, and the nonaqueous electrolyte in a battery case. The nonaqueous electrolyte contains a compound (I) represented by the following formula (I) LiO₃S—R—SO₃Li (wherein R represents a linear hydrocarbon group having 1 to 10 carbon atoms). When a BET specific surface area of the negative electrode mixture layer is represented by X (m²/g) and when an amount of the compound (I) with respect to the total amount of the nonaqueous electrolyte is represented by Y (mass %), the following relationships $3 \leq X \leq 4.3$, $0.2 \leq Y \leq 0.4$, and $(Y/X) \leq 0.093$ are satisfied.

9 Claims, 1 Drawing Sheet

LITHIUM SECONDARY BATTERY INCLUDING A NONAQUEOUS ELECTROLYTE CONTAINING A COMPOUND REPRESENTED BY LIO₃S—R—SO₃LI AND METHOD OF MANUFACTURING THE SAME

INCORPORATION BY REFERENCE

The disclosure of Japanese Patent Application No. 2015-073201 filed on Mar. 31, 2015 including the specification, drawings and abstract is incorporated herein by reference in its entirety.

BACKGROUND OF THE INVENTION

1. Field of the Invention

The present invention relates to a lithium secondary battery. Specifically, the invention relates to a lithium secondary battery which can be applied to a vehicle-mounted power supply and a method of manufacturing the same.

2. Description of Related Art

When a lithium secondary battery is initially charged, a portion of a nonaqueous electrolyte is decomposed such that a protective film (solid electrolyte interface film; SEI film) containing a decomposition product of the nonaqueous electrolyte is formed on a surface of a negative electrode. Due to the SEI film, an interface between the negative electrode and the nonaqueous electrolyte is stabilized, and the durability (for example, cycle characteristics) of the battery can be improved. Examples of prior art documents relating to this configuration include Japanese Patent Application Publication No. 2011-187440 (JP 2011-187440 A) and Japanese Patent Application Publication No. 2009-026691 (JP 2009-026691 A). For example, JP 2011-187440 A describes that the durability of a battery can be improved by adding a fluoroacid salt additive to a nonaqueous electrolyte to form a SEI film containing a component, which is derived from the fluoroacid salt, on a surface of a negative electrode.

However, according to the investigation by the present inventors, in a case where the above-described technique is applied to a battery (for example, a battery for a vehicle) in which high input and output densities and high capacity retention are required for a long period of, for example, 10 years or longer, there is room for further improvement. That is, while the battery is continuously used, the SEI film may deteriorate or may peel off from the surface of the negative electrode, and it is difficult to stably maintain the SEI film for a long period of time. A new SEI film is formed on a portion where the SEI film deteriorates. At this time, typically, the nonaqueous electrolyte is consumed, which may decrease the battery capacity. Accordingly, as the period of use of the battery increases, there is a problem in that the resistance increases or the capacity retention decreases. On the other hand, for example, when a battery is designed such that an increase in resistance is suppressed, initial characteristics (for example, initial resistance) may decrease. That is, it is difficult to simultaneously realize satisfactory initial characteristics and durability of a battery.

SUMMARY OF THE INVENTION

The invention provides a lithium secondary battery capable of maintaining and exhibiting satisfactory battery characteristics for a long period of time. The invention also provides a preferable method of manufacturing the above-described lithium secondary battery.

The present inventors studied a technique of forming a SEI film having low resistance and high durability on a surface of an electrode. As a result of a thorough investigation, the invention has been completed. According to a first aspect of the invention, there is provided a method of manufacturing a lithium secondary battery, the method including: preparing a positive electrode including a positive electrode mixture layer, a negative electrode including a negative electrode mixture layer, and a nonaqueous electrolyte; and accommodating the positive electrode, the negative electrode, and the nonaqueous electrolyte in a battery case. The nonaqueous electrolyte contains a compound (I) represented by the following formula (I) LiO₃S—R—SO₃Li (wherein R represents a linear hydrocarbon group having 1 to 10 carbon atoms). When a BET specific surface area of the negative electrode mixture layer is represented by X (m²/g) and when an addition amount of the compound (I) with respect to the total amount (100 mass %) of the nonaqueous electrolyte is represented by Y (mass %), the following relationships $3 \leq X \leq 4.3$, $0.2 \leq Y \leq 0.4$, and $(Y/X) \leq 0.093$ are satisfied.

According to the above-described configuration, typically, during initial charging and discharging, a high-quality SEI film containing a component derived from the compound (I) is appropriately formed on a surface of at least a negative electrode (preferably a positive electrode and a negative electrode). The SEI film may contain: lithium (Li) as a charge carrier; and a component derived from a sulfonic acid structure (for example, a sulfur atom-containing group such as a sulfonyl group or a sulfonyloxy group). As a result, a SEI film having low resistance and high durability is realized, and an interface between the electrode and the nonaqueous electrolyte is highly stabilized. Accordingly, according to the above-described method, a lithium secondary battery can be realized in which initial battery characteristics are satisfactory and in which an increase in resistance and a decrease in capacity retention are small even after continuous use for a long period of time.

For example, it is preferable that the compound (I) is dilithium 2-butene-1,4-disulfonate represented by the following formula (II):

According to a second aspect of the invention, there is provided a lithium secondary battery including: a positive electrode that includes a positive electrode mixture layer; a negative electrode that includes a negative electrode mixture layer; a battery case that accommodates the positive electrode and the negative electrode; and a nonaqueous electrolyte that is accommodated in the battery case. The nonaqueous electrolyte (in other words, the nonaqueous electrolyte accommodated in the battery case; hereinafter, the same shall be applied) contains a compound (I) represented by the following formula (I) LiO₃S—R—SO₃Li (wherein R represents a linear hydrocarbon group having 1 to 10 carbon atoms). When a BET specific surface area of the negative electrode mixture layer is represented by X (m²/g) and when an addition amount of the compound (I) with respect to the total amount (100 mass %) of the nonaqueous electrolyte accommodated in the battery case is represented by Y (mass %), the following relationships $3 \leq X \leq 4.3$, $0.2 \leq Y \leq 0.4$, and $(Y/X) \leq 0.093$ are satisfied.

According to this configuration, initial resistance can be suppressed to be low. Further, satisfactory battery characteristics (for example, input and output densities or energy density) can be maintained and exhibited for a long period of time.

According to the invention, a nonaqueous electrolyte for a lithium secondary battery is provided. The nonaqueous electrolyte contains a compound (I) represented by the following formula (I) $LiO_3S$—R—$SO_3Li$ (wherein R represents a linear hydrocarbon group having 1 to 10 carbon atoms). The compound (I) is, for example, dilithium 2-butene-1,4-disulfonate. An addition amount of the compound (I) with respect to the total amount (100 mass %) of the nonaqueous electrolyte may be, for example, 0.2 mass % to 0.4 mass %. According to the nonaqueous electrolyte, a (high-quality) SEI film having low resistance and high durability can be formed on a surface of an electrode. As a result, a lithium secondary battery having low initial resistance and superior long-term durability (for example, in which an increase in resistance after use for a long period of time is highly suppressed) can be suitably realized.

According to the invention, an additive for a nonaqueous electrolyte of a lithium secondary battery is provided. The additive for a nonaqueous electrolyte of a lithium secondary battery is a compound (I) represented by the following formula (I) $LiO_3S$—R—$SO_3Li$ (wherein R represents a linear hydrocarbon group having 1 to 10 carbon atoms). The compound (I) is, for example, dilithium 2-butene-1,4-disulfonate. According to the additive for a nonaqueous electrolyte, a (high-quality) SEI film having low resistance and high durability can be formed on a surface of an electrode. As a result, a lithium secondary battery having low initial resistance and superior long-term durability (for example, in which an increase in resistance after use for a long period of time is highly suppressed) can be suitably realized.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described appropriately with reference to the drawings. In each drawing, a dimensional relationship (for example, length, width, or thickness) does not reflect the actual dimensional relationship. Matters (for example, general techniques relating to the construction of a battery, such as, a configuration of an electrode body including a positive electrode and a negative electrode, a method of manufacturing the electrode body, a configuration of a separator, a method of manufacturing the separator, and a shape of a battery (case)) necessary to practice this invention other than those specifically referred to in this specification may be understood as design matters based on the related art in the pertinent field for a person of ordinary skill in the art. The invention can be practiced based on the contents disclosed in this specification and common technical knowledge in the pertinent field.

Figure 1:
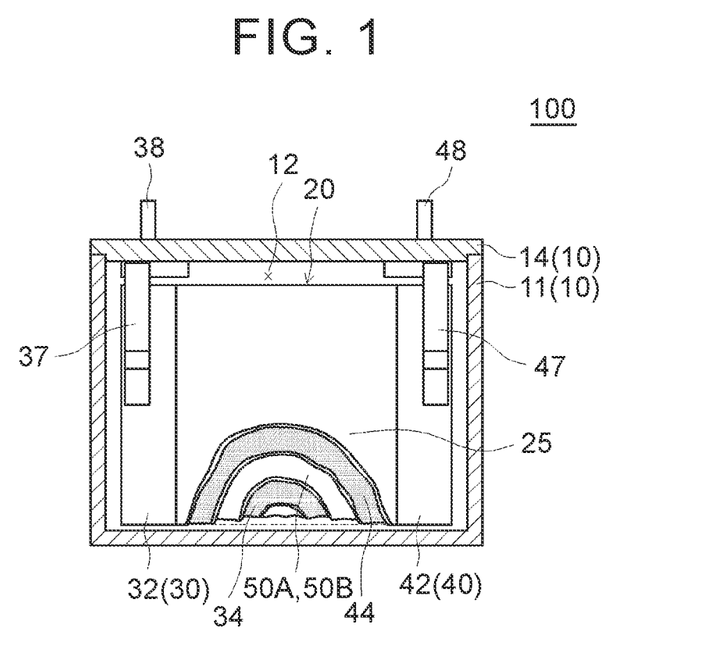
FIG. 1 is a schematic sectional view showing a lithium secondary battery according to an embodiment of the invention.

FIG. 1 is a schematic sectional view showing a lithium secondary battery according to an embodiment of the invention. A lithium secondary battery 100 described herein includes: a battery case 10; and a wound electrode body 20 that is accommodated in the battery case 10. A battery case body 11 of the battery case 10 has an opening 12 formed on a top surface thereof, and this opening 12 is sealed with a lid 14 after accommodating the wound electrode body 20 in the battery case 10 through the opening 12. A nonaqueous electrolytic solution 25 is also accommodated in the battery case 10. An external positive electrode terminal 38 and an external negative electrode terminal 48 for external connection are provided on the lid 14, and a part of the terminals 38, 48 protrude toward a surface side of the lid 14. A part of the external positive electrode terminal 38 is connected to an internal positive electrode terminal 37 in the battery case 10, and a part of the external negative electrode terminal 48 is connected to an internal negative electrode terminal 47 in the battery case 10. The internal terminals 37, 47 are connected to a positive electrode 30 and a negative electrode 40 which constitute the wound electrode body 20, respectively. The battery case (including the lid) may be formed of a metal material such as aluminum or a resin material such as polyphenylene sulfide. A shape of the battery case is not particularly limited and may be, for example, a cuboid shape or a cylindrical shape.

The wound electrode body 20 includes an elongated sheet-shaped positive electrode (positive electrode sheet) 30 and an elongated sheet-shaped negative electrode (negative electrode sheet) 40. The positive electrode sheet 30 includes: an elongated positive electrode current collector 32; and a positive electrode mixture layer 34 that is formed on at least one surface (typically, both surfaces) of the positive electrode current collector 32. The negative electrode sheet 40 includes: an elongated negative electrode current collector 42; and a negative electrode mixture layer 44 that is formed on at least one surface (typically, both surfaces) of the negative electrode current collector 42. The wound electrode body 20 also includes two elongated sheet-shaped separators (separator sheets) 50A, 50B. The positive electrode sheet 30 and the negative electrode sheet 40 are laminated with the two separator sheets 50A, 50B interposed therebetween. The laminate is wound in a longitudinal direction and is formed into a flat shape. The electrode body is not limited to a wound electrode body and can adopt an appropriate shape and an appropriate configuration according to the shape and intended use of the battery. Hereinafter, the respective components constituting the lithium secondary battery will be described.

As the positive electrode current collector constituting the positive electrode (for example, the positive electrode sheet) of the lithium secondary battery, a conductive member formed of a highly conductive metal is preferably used as in the case of the related art. For example, the conductive member may be formed of aluminum. The thickness of the positive electrode current collector may be, for example, about 5 μm to 30 μm.

The positive electrode mixture layer contains a positive electrode active material. As the positive electrode active material, various known materials which can be used as a positive electrode active material of a lithium secondary battery may be used without any particular limitation. Preferable examples of the positive electrode active material include a lithium transition metal compound containing lithium and at least one transition metal element. In a preferable embodiment, a lithium transition metal composite oxide containing Li and at least one of Ni, Co, and Mn is used as the positive electrode active material.

A proportion of Mn in the positive electrode active material is 10 mol % or higher (for example, 30 mol % or higher) with respect to 100 mol % of the total amount of all the transition metals in the positive electrode active material. Mn is likely to be relatively easily eluted in a high-temperature environment. Therefore, for example, in a case where a positive electrode active material containing the above-described proportion of Mn is used, it is preferable that the technique disclosed herein is applied. That is, in a battery in which the positive electrode active material containing the above-described proportion of Mn is used, an effect of improving the above-described durability (high-temperature storage characteristics) can be more preferably exhibited.

The form of the positive electrode active material is not particularly limited but, typically, is a particulate or powder form. The average particle size of the particulate positive electrode active material may be typically about 1 μm to 20 μm (for example, 2 μm to 10 μm). "Average particle size" refers to a particle size ("$D_{50}$" or "median size") corresponding to a cumulative value of 50 vol % in order from the smallest particle size in a volume particle size distribution based on a laser diffraction laser scattering method. A BET specific surface area of the particulate positive electrode active material may be 0.1 $m^2/g$ or more (typically 1 $m^2/g$ or more; for example, 2 $m^2/g$ or more) and may be 10 $m^2/g$ or less (for example, 5 $m^2/g$ or less). "BET specific surface area of an active material" refers to a value obtained by analyzing the surface area of an active material powder using a BET method (for example, one-point BET method), the surface area being measured using a nitrogen adsorption method.

In addition to the positive electrode active material, the positive electrode mixture layer optionally further contains additives such as a conductive material or a binder. As the conductive material, a conductive powder material such as carbon powder or carbon fiber is preferably used. As the carbon powder, various carbon blacks such as acetylene black is preferable.

Examples of the binder include various polymer materials. For example, in a case where the positive electrode mixture layer is formed using an aqueous composition (in which a dispersion medium is water or a mixed solvent containing water as a major component), a water-soluble or water-dispersible polymer material can be used. Examples of the water-soluble or water-dispersible polymer material include: cellulose polymers such as carboxymethyl cellulose (CMC); fluororesins such as polytetrafluoroethylene (PTFE); and rubbers such as styrene-butadiene rubber (SBR).

Alternatively, in a case where the positive electrode mixture layer is formed using a solvent-based composition (a composition in which a dispersion medium is mainly formed of an organic solvent), a polymer material can be used, and examples thereof include vinyl halide resins such as polyvinylidene fluoride (PVdF); and polyalkylene oxides such as polyethylene oxide (PEO). Among these binders, one kind can be used alone, or two or more kinds can be used in combination. The above-described exemplary polymer materials may function not only as the binder but also as a thickener, a dispersion material, or other additives.

It is preferable that a ratio of the mass of the positive electrode active material to the total mass of the positive electrode mixture layer is about higher than 50 mass % and is about 70 mass % to 97 mass % (typically, 75 mass % to 95 mass %). It is preferable that a ratio of the mass of the conductive material to the total mass of the positive electrode mixture layer is about 2 mass % to 20 mass % (for example, 3 mass % to 10 mass %). It is preferable that a ratio of the mass of the binder to the total mass of the positive electrode mixture layer is about 0.5 mass % to 10 mass % (for example, 1 mass % to 5 mass %).

A BET specific surface area of the positive electrode mixture layer is selected in an appropriate range in consideration of battery characteristics (for example, initial resistance and capacity retention). It is preferable that the BET specific surface area is 1 $m^2/g$ or more (typically 2 $m^2/g$ or more; for example, 2.4 $m^2/g$ or more) and is 5 $m^2/g$ or less (typically 4 $m^2/g$ or less). By adjusting the BET specific surface area to be a predetermined value or more, a reaction field with charge carriers can be appropriately secured, and initial resistance can be sufficiently reduced. As a result, more satisfactory input and output characteristics can be realized. By adjusting the BET specific surface area to be a predetermined value or less, the oxidation decomposition of the nonaqueous electrolyte on the positive electrode is suppressed, and an increase in irreversible capacity is suppressed. As a result, higher capacity retention can be realized. It is more preferable that a surface of the positive electrode mixture layer is covered with an SEI film having an appropriate amount and quality. As a result, the above-described satisfactory battery characteristics can be stably maintained for a long period of time. The BET specific surface area of the positive electrode mixture layer can be adjusted, for example, based on a BET specific surface area of the positive electrode active material.

The BET specific surface area of the mixture layer can be obtained, for example, as follows. That is, first, an appropriate amount of an electrode is cut. In a case where the lithium secondary battery is disassembled to extract the electrode, the cut electrode is washed with a nonaqueous solvent such as ethyl methyl carbonate. Next, using a spatula or the like, a mixture layer is collected from the electrode and is set as a sample. Next, using a specific surface area measuring device (for example, "SAP2010" manufactured by Shimadzu Corporation), the sample is predried (under degassing conditions) at 110° C. for 1 hour, and a specific surface area thereof is measured with a nitrogen adsorption method (using nitrogen gas as a adsorbate). The obtained specific surface area is analyzed using a BET method (for example, one-point BET method) to calculate a BET specific surface area ($m^2/g$). In Examples described below, the same method is adopted.

A method of manufacturing the positive electrode is not particularly limited, and a method of the related art can be appropriately adopted. For example, the following method is adopted. First, the positive electrode active material is mixed with the conductive material, the binder, and the like in an appropriate solvent to prepare a slurry-like composition for forming a positive electrode mixture layer. The mixing operation can be performed using, for example, an appropriate mixer (a planetary mixer or the like). As the solvent, either an aqueous solvent or an organic solvent can be used. For example, N-methyl-2-pyrrolidone (NMP) can be used. Next, the prepared composition is applied to the positive electrode current collector, and the solvent contained in the composition is removed. The composition applied to the positive electrode current collector is optionally pressed to obtain desired thickness and coating weight. In this way, the positive electrode is obtained in which the positive electrode mixture layer is formed on the positive electrode current collector. As a method of applying the composition to the positive electrode current collector, for example, a method using an appropriate coating device such as a die coater may be used. In order to remove the solvent, general drying means (for example, heat drying or vacuum drying) may be used.

The coating weight of the positive electrode mixture layer applied per unit area of the positive electrode current collector (coating amount of the composition for forming a positive electrode mixture layer in terms of solid content) is not particularly limited. However, from the viewpoint of simultaneously realizing high energy density and high input and output densities, it is preferable that the coating weight per single surface of the positive electrode current collector is 3 mg/cm$^2$ or more (for example, 10 mg/cm$^2$ or more; typically 20 mg/cm$^2$ or more) and is 100 mg/cm$^2$ or less (for example, 70 mg/cm$^2$ or less; typically 50 mg/cm$^2$ or less).

As the negative electrode current collector constituting the negative electrode (for example, the negative electrode sheet) of the lithium secondary battery, a conductive member formed of a highly conductive metal is preferably used as in the case of the related art. For example, the conductive member may be formed of copper. The thickness of the negative electrode current collector may be, for example, 5 μm to 30 μm.

The negative electrode mixture layer contains a negative electrode active material. As the negative electrode active material, various known materials which can be used as a negative electrode active material of a lithium secondary battery may be used without any particular limitation. As a preferable example of the negative electrode active material, for example, a carbon material can be used. Representative examples of the carbon material include graphite carbon (graphite) and amorphous carbon. In particular, a carbon material containing graphite as a major component (graphite-based carbon material) is preferably used. The graphite may be flaky graphite or spherical graphite. The surface of graphite may be coated with amorphous carbon.

Among these, the carbon material is preferable. As compared to, for example, an oxide such as lithium titanate or a compound such as a silicon material, the carbon material undergoes less volume changes (expansion and shrinkage) during charging and discharging and has higher durability. Therefore, in a case where the negative electrode active material is a carbon material, the effect of improving the durability can be exhibited at a higher level. In particular, graphite is superior in the orientation of a hexagonal net structure (graphitization degree). Therefore, among the carbon materials, graphite has higher energy density. Accordingly, in a case where the negative electrode active material is graphite, initial characteristics (for example, energy density) and durability can be simultaneously realized at a higher level. On the other hand, graphite has high orientation, whereas a side reaction other than charging and discharging is likely to occur therein. That is, the nonaqueous electrolyte is likely to be reduced and decomposed on a surface of the negative electrode active material. Therefore, when the invention of the present application is applied to a case where the negative electrode active material is graphite, the effects are particularly high.

The form of the negative electrode active material is not particularly limited but, typically, is a particulate or powder form. A BET specific surface area of the particulate negative electrode active material may be generally 1 m$^2$/g or more (typically 2.5 m$^2$/g or more; for example, 2.8 m$^2$/g or more) and may be 10 m$^2$/g or less (typically, 3.5 m$^2$/g or less; for example, 3.4 m$^2$/g or less).

In addition to the negative electrode active material, the negative electrode mixture layer optionally further contains additives such as a binder. Examples of the binder include various polymer materials. For example, a binder, which may be added to the positive electrode mixture layer when an aqueous composition or a solvent-based composition is used, can be suitably used. Such binder may function not only as the binder but also as a thickener, a dispersion material, or other additives.

It is preferable that a ratio of the mass of the negative electrode active material to the total mass of the negative electrode mixture layer is about higher than 50 mass % and is about 90 mass % to 99 mass % (for example, 95 mass % to 99 mass %; typically, 97 mass % to 99 mass %). It is preferable that a ratio of the mass of the additives to the total mass of the negative electrode mixture layer is about 1 mass % to 10 mass % (for example, 1 mass % to 5 mass %; typically, 1 mass % to 3 mass %).

In the lithium secondary battery according to the embodiment, a BET specific surface area of the negative electrode mixture layer may be 3 m$^2$/g to 4.3 m$^2$/g. By adjusting the BET specific surface area to be a predetermined value or more, a reaction field with charge carriers can be appropriately secured, and initial resistance can be sufficiently reduced. As a result, satisfactory input and output characteristics can be realized. By adjusting the BET specific surface area to be a predetermined value or less, the reduction decomposition of the nonaqueous electrolyte on the negative electrode is suppressed, and an increase in irreversible capacity is suppressed. As a result, high capacity retention can be realized. Further, in the embodiment, a surface of the negative electrode mixture layer is covered with an SEI film having an appropriate amount and quality. As a result, the above-described satisfactory battery characteristics can be stably maintained and exhibited for a long period of time. The BET specific surface area of the negative electrode mixture layer can be adjusted, for example, based on a BET specific surface area of the negative electrode active material.

A method of manufacturing the negative electrode is not particularly limited, and a method of the related art can be appropriately adopted. For example, the following method is adopted. First, the negative electrode active material is mixed with the binder and the like in an appropriate solvent to prepare a slurry-like composition for forming a negative electrode mixture layer. As the solvent, either an aqueous solvent or an organic solvent can be used. For example, water can be used. Next, the prepared composition is applied to the negative electrode current collector and the solvent contained in the composition is removed. Optionally, the composition is pressed. In this way, the negative electrode is obtained in which the negative electrode mixture layer is formed on the negative electrode current collector. The operations during the preparation of the negative electrode (for example, the mixing and application of the composition and the removal of the solvent) can be performed using the same method as the above-described method of preparing the positive electrode.

The coating weight of the negative electrode mixture layer applied per unit area of the negative electrode current collector (coating amount of the composition for forming a negative electrode mixture layer in terms of solid content) is not particularly limited. However, from the viewpoint of simultaneously realizing high energy density and high input and output densities, it is preferable that the coating weight per single surface of the negative electrode current collector is 2 mg/cm² or more (for example, 5 mg/cm² or more; typically 10 mg/cm² or more) and is 50 mg/cm² or less (for example, 30 mg/cm² or less; typically 20 mg/cm² or less).

The separator (separator sheet) which is arranged so as to separate the positive electrode and the negative electrode from each other may be a member which insulates the positive electrode mixture layer and the negative electrode mixture layer and allows the movement of charge carriers. Preferable examples of the separator include a member having a structure having two or more layers which are formed of polyethylene (PE), polypropylene (PP), or a combination thereof. In the separator sheet, for example, a heat resistance layer containing an inorganic filler as a major component may be provided. In a case where a solid (gel) nonaqueous electrolyte is used instead of a liquid nonaqueous electrolyte, the nonaqueous electrolyte also functions as a separator, and thus a separator may be unnecessary.

The nonaqueous electrolyte accommodated in the battery case contains a dilithium disulfonate compound represented by the following formula (I) LiO₃S—R—SO₃Li (hereinafter, also referred to as "compound (I)"). For example, during charging and discharging, the compound (I) is attracted to the electrode (positive electrode and/or negative electrode; mainly negative electrode) and may be contained in the SEI film formed on the surface of the electrode. The compound (I) is chemically or electrically decomposed on the surface of the electrode, and a decomposition product thereof may be attached (adsorbed or bonded) to the surface of the electrode. In this way, a high-quality SEI film containing a component derived from the compound (I) is formed on the surface of the electrode. The SEI film may have lower resistance and higher durability than, for example, a SEI film containing a component derived from an additive (so-called film forming agent) of the related art.

That is, the compound (I) contains lithium ions which are charge carriers of a lithium secondary battery. Therefore, there is an effect of increasing the abundance of lithium in the SEI film. As a result, the concentration of charge carriers in the vicinity of the negative electrode increases, and the intercalation and deintercalation of charge carriers during charging and discharging is performed more smoothly. That is, a SEI film having low resistance can be formed on the surface of the electrode. Accordingly, satisfactory battery characteristics (for example, satisfactory input and output characteristics) can be realized.

The compound (I) has a sulfonic acid structure (—SO₃⁻). The sulfonic acid structure has one sulfur atom (S) and three oxygen atoms (O), in which two oxo groups (═O) and one oxy group (—O⁻) are bonded to S. The component derived from the compound (I) may be strongly attached (adsorbed or bonded) to the surface of the electrode through the structure. As a result, a SEI film having higher durability can be formed on the surface of the electrode as compared to, for example, a case where an additive of the related art having no sulfonic acid structure is used. In other words, the SEI film on the surface of the electrode can be stably maintained for a long period of time. The compound (I) does not contain halogen such as a fluorine atom which may cause an increase in the resistance of the SEI film. Therefore, an increase in the resistance of the SEI film after use for a long period of time can be suppressed as compared to a case where the additive described in JP 2011-187440 A is used. Accordingly, according to the embodiment, superior long-term durability (for example, high capacity retention and low resistance) can be realized even when continuously used for a long period of time of, for example, 10 years or longer without being replaced with another one. This mechanism is not clear but is presumed to be that an increase in resistance is suppressed due to electron attracting properties, structural stability, and the like based on, for example, the sulfonic acid structure.

In the formula (I), R represents a linear hydrocarbon group (which is unsubstituted) having 1 to 10 carbon atoms. Examples of the linear hydrocarbon group include: a chain alkylene group having 1 to 10 carbon atoms such as methylene, ethylene, n-propylene, n-butylene, n-pentylene, hexylene, heptylene, or octylene; a chain alkenylene group having 2 to 10 carbon atoms such as vinylene, 1-propenylene, 2-propenylene, 1-butenylene, 2-butenylene, 1-pentenylene, 2-pentenylene, 1-hexenylene, 2-hexenylene, or 1-octenylene; a chain alkynylene group having 2 to 10 carbon atoms such as ethynylene, propynylene, butynylene, heptynylene, hexynylene, heptynylene, or octynylene; and a chain alkadienylene group having 4 to 10 carbon atoms such as 1,3-butadienylene.

R represents an unsaturated hydrocarbon group which may have, for example, a carbon-carbon double bond (C═C). In particular, a chain alkenylene group is preferable from the viewpoint of manufacturing easiness and the like. The carbon-carbon double bond may be present, for example, at an intermediate position of the linear hydrocarbon group. As a result, the SEI film derived from the compound (I) can be formed more favorably and stably. For example, the compound (I) may be reduced and decomposed on the negative electrode, and a decomposition product thereof may react (may be polymerized) on the surface of the negative electrode. As a result, a stronger (highly durable) SEI film can be formed on the surface of the negative electrode. A part of the decomposition product of the compound (I) may move to the positive electrode side to be attached to the surface of the positive electrode. As a result, the oxidation decomposition of the nonaqueous electrolyte on the positive electrode is suppressed, and an increase in irreversible capacity can be suppressed. Further, the stability of the positive electrode active material is improved. For example, the elution of a constituent element such as Mn can also be suppressed. Due to a synergistic effect of the above points, satisfactory battery characteristics can be realized for a longer period of time.

As the compound (I), one kind or a combination of two or more kinds selected from compounds synthesized using a well-known method and commercially available compounds can be used without any particular limitation. In the formula (I), the number of carbon atoms in R may be 2 to 6, for example, 3 to 5. Therefore, a SEI film having lower resistance can be formed. As a result, for example, initial resistance can be reduced at a higher level, and more satisfactory battery characteristics (for example, input and output characteristics) can be realized.

In a more preferable embodiment, as the compound (I), dilithium 2-butene-1,4-disulfonate (a lithium salt of 2-butene-1,4-disulfonic acid) represented by the following formula (II) is used.

(II)

Dilithium 2-butene-1,4-disulfonate can be synthesized, for example, in the following procedure. A reaction in the first step can be performed with reference to, for example, Org. Bio. Chem., 2012, p. 2870.

The addition amount of the compound (I) may be determined according to, for example, the kind of the active material used, the characteristics of the mixture layer (for example, BET specific surface area), and the use of the battery. For example, in a case where a negative electrode mixture layer having a BET specific surface area of 3 $m^2/g$ to 4.3 $m^2/g$ is adopted, a ratio (addition amount) of the compound (I) to 100 mass % of the total amount of the nonaqueous electrolyte accommodated in the battery case may be 0.2 mass % or higher (for example, 0.25 mass % or higher). By adjusting the addition amount to be a predetermined value or higher, the SEI film on the surface of the electrode contains a sufficient amount of the compound (I). As a result, the addition effect of the compound (I) is sufficiently exhibited. For example, an increase in resistance during high-temperature storage can be suppressed at a higher level, and durability can be suitably improved. The upper limit of the ratio (addition amount) of the compound (I) may be determined in consideration of, for example, the solubility in a nonaqueous solvent and the characteristics of the mixture layer (for example, BET specific surface area). For example, in a case where a negative electrode mixture layer having a BET specific surface area of 3 $m^2/g$ to 4.3 $m^2/g$ is adopted, a ratio (addition amount) of the compound (I) to 100 mass % of the total amount of the nonaqueous electrolyte accommodated in the battery case may be 0.4 mass % or lower (for example, 0.32 mass % or lower). By adjusting the addition amount to be a predetermined value or lower, an increase in resistance caused by excessive addition of the compound (I) can be suppressed at a high level. Further, a uniform nonaqueous electrolyte can be realized in which a defect such as deposition is not likely to occur.

In the embodiment, when the BET specific surface area of the negative electrode mixture layer per unit area is represented by X ($m^2/g$) and when the addition amount of the compound (I) with respect to the total amount of the nonaqueous electrolyte accommodated in the battery case is represented by Y (mass %), it is preferable that the following expression (Y/X)≤0.093 is satisfied. In other words, the addition amount of the compound (I) with respect to the BET specific surface area of the negative electrode mixture layer is adjusted to be a predetermined value or lower. Therefore, the formation of an excess amount of a film on the surface of the negative electrode mixture layer is suppressed. As a result, an increase in resistance caused by excessive addition of the compound (I) is suppressed. Further, for example, a change in the specification of the negative electrode mixture layer (for example, the form of the negative electrode active material) can also be appropriately handled. Therefore, the effects of the invention can be exhibited at a higher level.

X and Y may satisfy the following expression Y≤0.1154X−0.0962. As a result, improvement of durability (for example, suppression of an increase in resistance during high-temperature storage) and other battery characteristics (capacity retention and initial resistance) can be simultaneously realized at a higher level. X and Y may satisfy the following expression Y≥0.0923X−0.0769. As a result, the effects of the invention can be exhibited at a higher level.

In addition to the compound (I), the nonaqueous electrolyte accommodated in the battery case typically contains a nonaqueous solvent and a supporting electrolyte. As a specific example, a nonaqueous electrolytic solution containing the compound (I) and a supporting electrolyte in an appropriate nonaqueous solvent can be used. The nonaqueous electrolytic solution is liquid at a normal temperature (for example, 25° C.). In a preferred embodiment, the nonaqueous electrolytic solution is usually liquid in a usage environment of a battery (for example, in an environment having temperature range of −20° C. to +60° C.).

As the supporting electrolyte, various known materials which can be used as a supporting electrolyte (lithium salt) in a nonaqueous electrolyte of a lithium secondary battery may be used without any particular limitation. Preferable examples of the supporting electrolyte include $LiPF_6$, $LiBF_4$, $LiAsF_6$, $LiCF_3SO_3$, $LiC_4F_9SO_3$, $LiN(CF_3SO_2)_2N$, $LiC(CF_3SO_2)_3$, $LiSiF_6$, and $LiClO_4$. Among these, one kind may be used, or a combination of two or more kinds may be used. In particular, $LiPF_6$ or $LiBF_4$ is preferable. The concentration of the supporting electrolyte in the nonaqueous electrolyte accommodated in the battery case may be appropriately set based on common technical knowledge of those skilled in the art. It is preferable that the concentration is in a range of about 0.1 mol/L to 5 mol/L (for example, 0.5 mol/L to 3 mol/L; typically, 0.8 mol/L to 1.5 mol/L).

As the nonaqueous solvent, various organic solvents which can be used in a nonaqueous electrolyte of a general lithium secondary battery, for example, carbonates, ethers, esters, nitriles, sulfones, and lactones can be used. Examples of the organic solvents include ethylene carbonate (EC), propylene carbonate (PC), diethyl carbonate (DEC), dimethyl carbonate (DMC), ethyl methyl carbonate (EMC), vinylene carbonate, 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, acetonitrile, propionitrile, nitromethane, N,N-dimethylformamide, dimethyl sulfoxide, sulfolane, γ-butyrolactone, and fluorides of the above compounds (for example, fluorinated carbonates such as monofluoroethylene carbonate and difluoroethylene carbonate). Among these, one kind may be used, or a mixture of two or more kinds may be used.

Preferable examples of the nonaqueous solvent include a carbonate solvent. The carbonate solvent described herein refers to a nonaqueous solvent in which the total volume of carbonates is preferably 60 vol % or more (more preferably 75 vol % or more, still more preferably 90 vol % or more; may be substantially 100 vol %) with respect to the total volume of the nonaqueous solvent. In a configuration in which the nonaqueous electrolyte contains the carbonate solvent and the compound (I), a SEI film having lower resistance can be formed on the surface of the electrode. Accordingly, the effects of the invention can be more preferably exhibited.

From the viewpoints of electrical conductivity, electrochemical stability, and the like, a combination of a cyclic carbonate and a chain carbonate is preferable as the carbonate. For example, a mixing ratio of the cyclic carbonate to the chain carbonate in terms of volume is preferably 20:80 to 40:60. As the cyclic carbonate, EC or PC is preferable, and EC is more preferable. As the chain carbonate, DEC, DMC, or EMC is preferable, and DMC or EMC is more preferable. In a case where DMC and/or EMC is used as the chain carbonate, the mixing ratio of DMC to EMC in terms of volume is 0:100 to 100:0 and preferably 20:80 to 80:20 (for example, 40:60 to 70:30; typically, 50:50 to 65:35).

The nonaqueous electrolyte accommodated in the battery case may optionally contain arbitrary additives within a range where the effects of the invention do not deteriorate. The additives are used for one or two or more of the purposes including: improvement of input and output characteristics of the battery; improvement of storage characteristics; improvement of cycle characteristics; and improvement of initial charge-discharge efficiency. Preferable examples of the additives include fluorophosphates (preferably, difluorophosphates; for example, lithium difluorophosphate represented by $LiPO_2F_2$) and a so-called film forming agent such as lithium bis(oxalato)borate (LiBOB). Further, an additive used for preventing overcharge, for example, cyclohexylbenzene or biphenyl may also be used.

The lithium secondary battery according to the embodiment includes: a positive electrode that includes a positive electrode active material; a negative electrode that includes a negative electrode active material; and a battery case that accommodates the positive electrode and the negative electrode. In this lithium secondary battery, a nonaqueous electrolyte is accommodated in the battery case. The nonaqueous electrolyte may contain the compound (I). A high-quality SEI film containing a component derived from the compound (I) is formed on a surface of at least the negative electrode (preferably, the positive electrode and the negative electrode). Therefore, initial characteristic and durability of the battery can be simultaneously realized with a good balance. As a result, significant effects are exhibited in that: initial battery characteristics are satisfactory; and an increase in resistance or a decrease in capacity retention is small even after continuous use for a long period of time.

Whether or not the component derived from the compound (I) is present can be determined, for example, as follows. For example, in order to evaluate the nonaqueous electrolyte, a hole is formed on the top surface of the battery case, and the nonaqueous electrolyte is extracted through the hole and is set as a measurement sample. For example, in order to evaluate the SEI film on the surface of the electrode (for example, negative electrode), the electrode is extracted and is dipped in an appropriate solvent (for example, 50% acetonitrile aqueous solution) for a predetermined amount of time. As a result, a film component (for example, Li+ or a sulfur atom-containing group such as $SO_3^-$ or $SO_4^{2-}$) is extracted from the solvent and set as a measurement sample. Next, this measurement sample is provided for a well-known measurement method of the related art such as ion chromatography (IC), gas chromatography-mass spectrometry (GC-MS), liquid chromatography-mass spectrometry (LC-MS), X-ray absorption fine structure (XAFS), or inductively coupled plasma-atomic emission spectrometry (ICP-AES). Through the measurement, the film component can be qualitatively and quantitatively analyzed. This measurement method may be appropriately selected based on, for example, the kind of an element which is a measurement object.

The lithium secondary battery according to the embodiment can be used for various applications and exhibits superior durability due to the effects obtained by adding the compound (I) to the nonaqueous electrolyte. As initial resistance decreases, battery characteristics can be more favorably maintained. Therefore, satisfactory input and output characteristics can be maintained for a long period of time, and durability is superior. The lithium secondary battery can be suitably used as a power source (driving power supply) for a motor mounted in a vehicle such as a hybrid vehicle (HV), a plug-in hybrid vehicle (PHV), or an electric vehicle (EV). Therefore, according to the invention, a vehicle is provided in which the lithium secondary battery according to the embodiment (which may have the form of a battery pack in which plural batteries are connected to each other) is mounted.

Next, several examples relating to the invention will be described, but the examples are not intended to limit the invention.

[Preparation of Positive Electrode]

$LiNi_{0.33}Co_{0.33}Mn_{0.33}O_2$ as a positive electrode active material; acetylene black (AB) as a conductive material; and polyvinylidene fluoride (PVdF) as a binder were mixed with each other using N-methyl-2-pyrrolidone (NMP) such that a mass ratio of the materials was 90:8:2. As a result, a slurry-like composition for forming a positive electrode mixture layer was prepared. This composition was applied to both surfaces of an aluminum foil (thickness: 15 μm) such that the coating weight per single surface was 30 mg/cm$^2$ (in terms of solid content). This coated material was dried and pressed. As a result, a positive electrode sheet in which a positive electrode mixture layer was formed on both the surfaces of the positive electrode current collector was prepared. The BET specific surface area of the positive electrode mixture layer was 3 m$^2$/g.

[Preparation of Negative Electrode]

Natural graphite powder as a negative electrode active material; styrene-butadiene rubber (SBR) as a binder; and carboxymethyl cellulose (CMC) as a dispersion material were mixed with each other using ion exchange water such that a mass ratio of the materials was 98:1:1. As a result, a slurry-like composition for forming a negative electrode mixture layer was prepared. This composition was applied to both surfaces of a copper foil (thickness: 10 μm) such that the coating weight per single surface was 15 mg/cm$^2$. This coated material was dried and pressed. As a result, a negative electrode sheet in which a negative electrode mixture layer was formed on both the surfaces of the negative electrode current collector was prepared. A BET specific surface area X (m$^2$/g) of the negative electrode mixture layer according to each example was adjusted to have a value shown in Table 1 by using negative electrode active materials having different BET specific surface areas.

[Construction of Lithium Secondary Battery]

Figure 2:
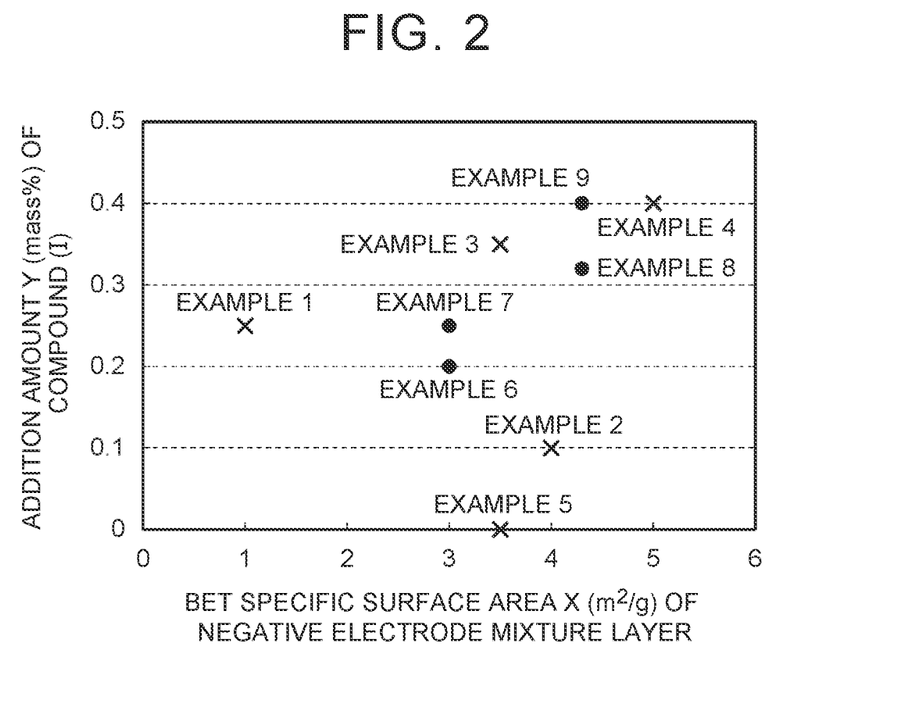
FIG. 2 is a graph showing a BET specific surface area of a negative electrode mixture layer and an addition amount of a compound (I).

The positive electrode sheet and the negative electrode sheet prepared as described above were wound together with two separator sheets to prepare a wound electrode body. As the separator sheet, a sheet having a three-layer structure (PP/PE/PP) in which a polypropylene (PP) layer was laminated on both surfaces of a polyethylene (PE) layer was used. Positive and negative electrode terminals were joined to end portions of the positive and negative electrode current collectors of the wound electrode body, and the components were accommodated in an aluminum battery case. Next, a nonaqueous electrolytic solution was injected into the battery case, and the battery case was sealed. As a result, a 18650 cylindrical lithium secondary battery was constructed. As the nonaqueous electrolytic solution, a solution was used in which $LiPF_6$ as a supporting electrolyte was dissolved in a mixed solvent at a concentration of 1.1 mol/L and in which dilithium 2-butene-1,4-disulfonate represented by the formula (II) as the compound (I) was further added to the mixed solvent in an addition amount Y (mass %) shown in Table 1, the mixed solvent containing ethylene carbonate (EC), dimethyl carbonate (DMC), and ethyl methyl carbonate (EMC) at a volume ratio (EC:DMC:EMC) of 30:40:30. FIG. 2 shows the BET specific surface area of the negative electrode mixture layer and the addition amount of a compound (I) in each test example.

[Measurement of Initial Capacity]

Regarding the lithium secondary battery according to each example, the initial capacity was measured at a temperature of 25° C. through the following steps 1 to 3.
(Step 1)
The battery was discharged at a constant current of 1/3 C until the voltage reached 3.0 V. Next, the battery was discharged at a constant voltage for 2 hours, and then the operation was stopped for 10 minutes.
(Step 2)
The battery was charged at a constant current of 1/3 C until the voltage reached 4.1 V. Next, the battery was charged at a constant voltage until the current reached 1/100 C, and then the operation was stopped for 10 minutes.
(Step 3)
The battery was discharged at a constant current of 1/3 C until the voltage reached 3.0 V. Next, the battery was discharged at a constant voltage until the current reached 1/100 C, and then the operation was stopped for 10 minutes. The discharge capacity in Step 3 (CCCV discharge capacity) was set as the initial capacity.

[Measurement of Initial Resistance (IV Resistance)]

Regarding the lithium secondary battery according to each example, the SOC was adjusted to 60% at a temperature of 25° C. The battery whose SOC was adjusted to 60% were discharged at a constant current (CC) at a rate of 10 C for 10 seconds, and the voltage drop amount after 10 seconds from discharging was measured. The IV resistance (me) was calculated by dividing the measured voltage drop amount by the current value during CC discharging and was set as the initial resistance. The results are shown in Table 1.

[High-Temperature Storage Test]

Regarding the lithium secondary battery according to each example, the SOC was adjusted to 85% at a temperature of 25° C. The battery whose SOC was adjusted to 85% were stored in a thermostatic chamber at a temperature of 60° C. for 30 days. After completion of the test, the battery was extracted from the thermostatic chamber, and the battery capacity and the IV resistance thereof were measured at a temperature of 25° C. using the same method as the method of measuring the initial capacity and the initial resistance. The measured values after the high-temperature storage test were divided by the initial values to calculate a capacity retention (%) and a resistance increase rate (%). The results are shown in Table 1.

TABLE 1

|  | Example 1 | Example 2 | Example 3 | Example 4 | Example 5 | Example 6 | Example 7 | Example 8 | Example 9 |
|---|---|---|---|---|---|---|---|---|---|
| Addition Amount Y (mass %) of Compound (I) | 0.25 | 0.1 | 0.35 | 0.4 | 0 | 0.2 | 0.25 | 0.32 | 0.4 |
| BET Specific Surface Area X ($m^2$/g) of Negative Electrode Mixture Layer | 1 | 4 | 3.5 | 5.0 | 3.5 | 3.0 | 3.0 | 4.3 | 4.3 |
| Y/X | 0.250 | 0.025 | 0.100 | 0.080 | 0 | 0.067 | 0.083 | 0.074 | 0.093 |
| Resistance Increase Rate (%) | 105 | 124 | 119 | 105 | 130 | 107 | 106 | 104 | 103 |
| Capacity Retention (%) | 93 | 94 | 92 | 85 | 92 | 93 | 94 | 92 | 92 |
| Initial Resistance (mΩ) | 76 | 27 | 22 | 24 | 32 | 24 | 23 | 22 | 21 |

As shown in Table 1, in Examples 2 and 5 in which the addition amount of the compound (I) was lower than 0.1 mass %, a significant increase in resistance was shown after high-temperature storage. That is, in a case where the absolute addition amount of the compound (I) is excessively small with respect to the BET specific surface area of the negative electrode mixture layer, the effects of the invention may be low. On the other hand, in the nonaqueous electrolytic solution used herein, when the addition amount of the compound (I) was higher than 0.4 mass %, the solubility reached the limit. That is, by adjusting the addition amount of the compound (I) to be the solubility or lower, the nonaqueous electrolyte can be maintained to be more uniform. In Example 1 in which the BET specific surface area of the negative electrode mixture layer was 1 $m^2$/g, the initial resistance was two times or higher than those of the other examples. That is, in a case where the BET specific surface area of the negative electrode mixture layer is excessively small, the initial resistance is likely to increase. On the other hand, in Example 4 in which the BET specific surface area of the negative electrode mixture layer was 5 $m^2$/g, the capacity retention after high-temperature storage decreased. That is, in a case where the BET specific surface area of the negative electrode mixture layer is excessively large, the capacity retention is likely to deteriorate. In Example 3 in which the ratio (Y/X) of the addition amount Y of the compound (I) to the BET specific surface area X of the negative electrode mixture layer was higher than 0.1, the resistance increase rate after high-temperature storage was high. That is, in a case where the addition amount of the compound (I) is excessively large with respect to the BET specific surface area of the negative electrode mixture layer, the amount of a film formed per unit specific surface area of the negative electrode mixture layer may be large (the thickness of the film may be large). Alternatively, a residue of the compound (I) causes a side reaction, which may cause a decrease in the quality of the SEI film. Therefore, the effects of the invention may be low. On the contrary, in Examples 6 to 9, the initial resistance was suppressed to be low, the capacity retention after high-temperature storage was superior, and an increase in resistance after high-temperature storage was suppressed.

From the above results, the following was found. By adding the compound (I) (in these examples, dilithium 2-butene-1,4-disulfonate) to the nonaqueous electrolyte, an increase in resistance after high-temperature storage is suppressed. By setting the BET specific surface area X of the negative electrode mixture layer, the addition amount Y of the compound (I), and the ratio (Y/X) thereof to be in the predetermined ranges, the initial resistance is sufficiently suppressed, and superior durability (maintaining of capacity retention and suppression of an increase in resistance) can be realized. Due to these effects, a (highly durable) lithium secondary battery capable of maintaining and exhibiting satisfactory battery characteristics (for example, input and output characteristics) for a long period of time can be realized.

Hereinabove, the specific examples of the invention have been described in detail. However, these examples are merely exemplary.

What is claimed is:

1. A method of manufacturing a lithium secondary battery, the method comprising:
preparing a positive electrode including a positive electrode mixture layer, a negative electrode including a negative electrode mixture layer, and a nonaqueous electrolyte containing a compound represented by:

and
accommodating the positive electrode, the negative electrode, and the nonaqueous electrolyte in a battery case,
a BET specific surface area of the negative electrode mixture layer from 3 m$^2$/g to 4.3 m$^2$/g and is represented by X,
an amount of the compound with respect to a total amount of the nonaqueous electrolyte is from 0.2 to 0.4 mass % and represented by Y,
the lithium secondary battery satisfies the relationship 0.067≤Y/X≤0.093,
the nonaqueous electrolyte further contains a nonaqueous solvent and a supporting electrolyte,
the nonaqueous solvent is at least one organic solvent selected from carbonates, ethers, esters, nitriles, sulfones, or lactones,
the supporting electrolyte is at least of LiPF$_6$, LiBF$_4$, LiAsF$_6$, LiCF$_3$SO$_3$, LiC$_4$F$_9$SO$_3$, LiN(CF$_3$SO$_2$)$_2$N, LiC(CF$_3$SO$_2$)$_3$, LiSiF$_6$, or LiClO$_4$, and
a concentration of the supporting electrolyte in the nonaqueous electrolyte is in a range of 0.1 mol/L to 5 mol/L.

2. The method according to claim 1, wherein a BET specific surface area of the positive electrode mixture layer is within a range of 1 m$^2$/g to 5 m$^2$/g.

3. The method according to claim 1, wherein the X and the Y satisfy the following relationships 0.0923X-0.0769≤Y≤0.1154X-0.0962.

4. The method according to claim 1, wherein the positive electrode mixture layer comprises a lithium transition metal compound containing lithium and at least one transition metal element.

5. The method according to claim 4, wherein the positive electrode mixture layer further comprises a conductive material or a binder.

6. The method according to claim 1, wherein the negative electrode mixture layer comprises a carbon material containing graphite as a major component.

7. The method according to claim 6, wherein the negative electrode mixture layer further comprises a binder.

8. The method according to claim 1, further comprising assembling an electrode body containing the positive electrode and negative electrode; accommodating the electrode body in a battery case; and injecting the nonaqueous electrolyte containing the compound into the battery case.

9. A lithium secondary battery comprising:
a positive electrode that includes a positive electrode mixture layer;
a negative electrode that includes a negative electrode mixture layer;
a nonaqueous electrolyte that contains a compound represented by:

and
a battery case that accommodates the positive electrode, the negative electrode and the nonaqueous electrolyte,
a BET specific surface area of the negative electrode mixture layer is from 3 m$^2$/g to 4.3 m$^2$/g and is represented by X,
an amount of the compound with respect to a total amount of the nonaqueous electrolyte accommodated in the battery case is from 0.2 to 0.4 mass % and is represented by Y,
the lithium secondary battery the relationship, and 0.067≤Y/X≤0.093,
the nonaqueous electrolyte further contains a nonaqueous solvent and a supporting electrolyte,
the nonaqueous solvent is at least one organic solvent selected from carbonates, ethers, esters, nitriles, sulfones, or lactones,
the supporting electrolyte is at least of LiPF$_6$, LiBF$_4$, LiAsF$_6$, LiCF$_3$SO$_3$, LiC$_4$F$_9$SO$_3$, LiN(CF$_3$SO$_2$)$_2$N, LiC(CF$_3$SO$_2$)$_3$, LiSiF$_6$, or LiClO$_4$, and
a concentration of the supporting electrolyte in the nonaqueous electrolyte is in a range of 0.1 mol/L to 5 mol/L.

* * * * *